United States Patent
Katagiri et al.

(10) Patent No.: US 6,362,555 B1
(45) Date of Patent: Mar. 26, 2002

(54) SMALL MOTOR WITH IMPROVED CONNECTING STRUCTURE BETWEEN COIL, RISER AND VARISTOR

(75) Inventors: Masayuki Katagiri; Hiromitsu Takei, both of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/888,447

(22) Filed: Jun. 26, 2001

Related U.S. Application Data

(63) Continuation of application No. 09/627,325, filed on Jul. 27, 2000, now Pat. No. 6,285,109, which is a continuation of application No. 09/132,774, filed on Aug. 12, 1998, now Pat. No. 6,153,960.

(30) Foreign Application Priority Data

Aug. 12, 1997 (JP) .............................. 9-230281

(51) Int. Cl.⁷ ................................. H02K 1/24
(52) U.S. Cl. ............... 310/269; 310/40 MM; 310/51; 310/219; 310/220; 310/233; 310/234; 310/235; 310/261; 310/268
(58) Field of Search ................ 310/269, 261, 310/235, 234, 233, 220, 51

(56) References Cited

U.S. PATENT DOCUMENTS

| | | | | |
|---|---|---|---|---|
| 4,420,704 A | * | 12/1983 | Mabuchi | 310/220 |
| 4,769,566 A | * | 9/1988 | Matsuda | 310/40 MM |
| 4,859,893 A | * | 8/1989 | Wang | 310/234 |
| 4,983,866 A | * | 1/1991 | Lok | 310/43 |
| 5,095,239 A | * | 3/1992 | Wang | 310/221 |
| 5,293,092 A | * | 3/1994 | Strobl | 310/233 |
| 5,473,212 A | * | 12/1995 | Crook et al. | 310/221 |
| 5,796,203 A | * | 8/1998 | Wang | 310/233 |
| 5,895,990 A | * | 4/1999 | Lau | 310/51 |

* cited by examiner

Primary Examiner—Elvin Enad
(74) Attorney, Agent, or Firm—Sughrue Mion, PLLC

(57) ABSTRACT

When winding an armature coil, start S of a winding is entwined around a riser R1, the wire is wound via a riser R4 around a salient pole P1 adjacent to the riser R4 and an opposed salient pole P2 to the salient pole P1 in order, and leads from a riser R3 through an opposed riser R6 to an adjacent salient pole P3 and an opposed salient pole P4. Next, the wire is passed to a riser R5 and is wound around an opposed riser R2, an adjacent salient pole P5, and a salient pole P6, then ends with the riser R4. A varistor 18 is inserted and three electrodes 19 are soldered to the corresponding risers R2, R4, and R6.

7 Claims, 5 Drawing Sheets

SMALL MOTOR WITH IMPROVED CONNECTING STRUCTURE BETWEEN COIL, RISER AND VARISTOR

This is a continuation of application Ser. No. 09/627,325 (now U.S. Pat. No. 6,285,109 issued Sep. 4, 2001) filed Jul. 27, 2000, which is a continuation of application Ser. No. 09/132,774 filed Aug. 12, 1998 (now U.S. Pat. No. 6,153,960 issued Nov. 28, 2000), the disclosures of each of which are incorporated herein by reference.

BACKGROUND OF THE INVENTION

1. Field of the Invention

2. Related Art

As shown in FIG. 5, generally, in a structure of an armature 50 of a small brush DC motor of a 4-6 (4-magnetic-pole—6-salient-pole) structure, for wiring of coils 53 wound around six radially projecting salient poles 52 of an armature core 51 and six risers 55 electrically conducting as terminals of six commutators 54, a circuit is previously formed with a substrate or electrode print pattern 57 (hatched portion in the figure) formed as a thick film on one side of a ring varistor 56, the windings of the coils 53 wound around the six salient poles 52 are connected to the six risers 55 extended from the corresponding six commutators 54, and the electrode print pattern 57 of the ring varistor 56 are joined to the faces of the risers 55 by soldering 58, forming the armature 50.

The electrode print pattern 57 illustrated in FIG. 5 is a circuit pattern conducting so that a pair of two long and short risers formed interposing the rotation center of the armature therebetween becomes the same potential; three circuit patterns for the three pairs of risers are formed in the same shape and electrically independent of each other.

That is, the circuit pattern for electrically connecting a pair of risers, for example, extends from one long riser round the outside of a short riser in another pair adjacent to the pair through the lower side of a long riser in still another pair adjacent the pair to the associated short riser. The three circuit print patterns 57 are formed on one side of the ring varistor 56 and a pair of long and short risers is connected by soldering 58 for each print pattern 57. Further, the three circuit patterns are placed so as to separately contain three electrodes disposed in the ring varistor 56 and are electrically connected.

The above-described wiring structure uses the circuit formed in the ring varistor 56 as a part of a current diverting circuit of the coil 53 by the commutator 54.

However, to flatten and miniaturize a motor, it is difficult to place the electrode print pattern 57 in the ring varistor 56 and the ring varistor 56 is specifically designed and manufactured; it is unavoidable that the product becomes expensive.

Further, if the electrode print pattern 57 placed in the ring varistor 56 becomes small, it easily comes in contact with another pattern and positioning accuracy with the risers 55 becomes strict; it is feared that an electric short circuit may be produced when coil terminals are connected or soldered.

SUMMARY OF THE INVENTION

It is therefore an object of the invention to apply a normal ring varistor provided with three electrodes used with a general armature of a 2-3 (2-magnetic-pole—3-salient-pole) structure having three electrode parts in an armature in a 4-6 structure. It is accomplished by a coil winding method around salient poles that a normal 3-electrode varistor provides an overvoltage suppression effect equal to that of a varistor specifically designed for an armature of a 4-6 structure.

It is more particularly to solder three of six risers directly to three electrodes of a varistor together with coil winding terminals and solder only coil winding terminals to the remaining three risers each between the electrodes of the varistor for forming an armature, in short, route a coil winding around salient poles in a manner of drawing with a single stroke of a brush containing connection to the risers.

According to an aspect of the present invention, there is provided a small motor comprising:

an armature having six salient poles radially and a coil wound around the salient poles;

six risers connected to said coil;

commutators being joined to said risers in a one-to-one correspondence;

a ring varistor being connected to said riser for suppressing overvoltage;

a brush coming in sliding contact with said commutator for supplying a current; and a permanent magnet having four magnetic poles, placed facing the salient poles, wherein said coil includes one wire wound continuously around the six salient poles and the six risers from a winding start terminal to a winding end terminal and said ring varistor is provided with three electrode parts to which alternate three of said six risers are connected.

As described above, according to the small motor according to the invention, a general ring varistor used with an armature of a 2-3 (2-magnetic-pole—3-salient-pole) structure can be applied to a device for extinguishing spark arcs for suppressing overvoltage of an armature of a 4-6 (4-magnetic-pole—6-salient-pole) structure without special working and moreover a special wiring pattern is not used, thus part-to-part accuracy is not required and the structure and parts management can be simplified sufficiently.

Because of coil winding according to a pattern drawn with a single stroke of a brush, automation is facilitated and productivity can be improved. Further, the varistor can be miniaturized, so that the armature itself can be well fitted to miniaturization.

BRIEF DESCRIPTION OF THE DRAWINGS

FIG. 1a is a plan view of one embodiment of an armature of a small motor according to the invention and FIG. 1b is a sectional view taken on line B—B in FIG. 1a;

DETAILED DESCRIPTION OF THE PREFERRED EMBODIMENTS

Figure 1A:
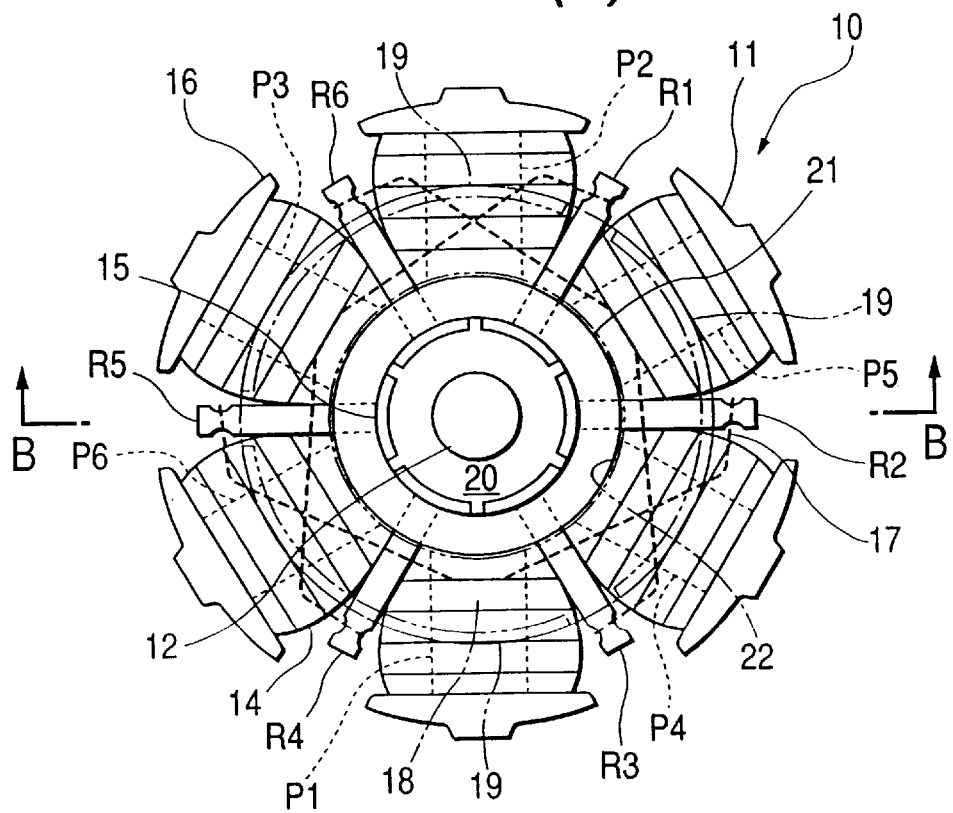
Figure 1B:
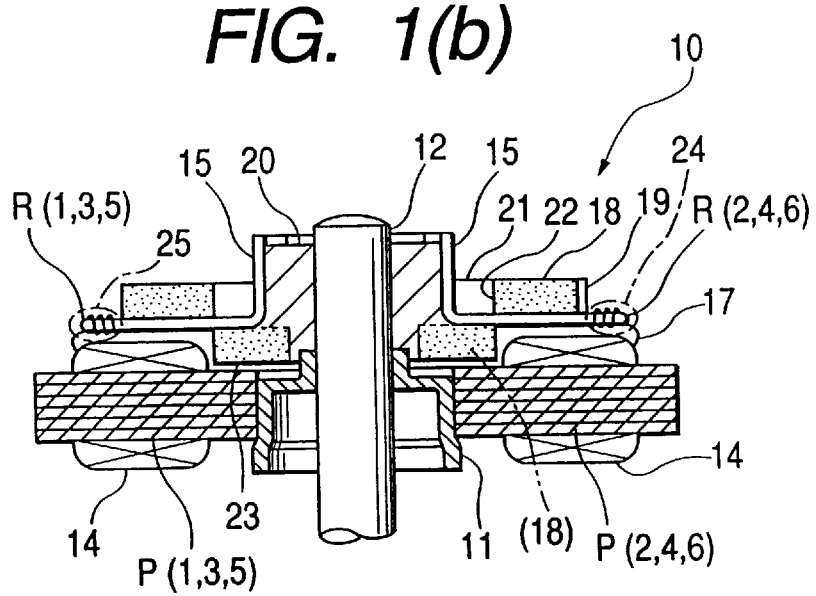

An embodiment of a small motor according to the invention will be discussed with reference to the accompanying drawings. FIG. 1a is a plan view to show an armature 10 of a small brush DC motor and FIG. 1b is a sectional view taken on line B—B in FIG 1a. The structure of the small motor containing a brush coming in sliding contact with a commutator 15 for supplying a current and a permanent magnet having four magnetic poles, placed facing salient poles is known and is not shown.

A shaft 12 is inserted into the center of an armature core 11 and fixed and an insulator or insulating coating for electrically insulating coils 14 wound around salient poles P1–P6 is applied to the surface of the armature core 11, then a commutator holder 20 for separately insulating six commutators 15 joined to risers R1–R6 integrally and supporting in integral mold of insert (or outsert) mold is fixed to a predetermined position of the shaft 12 on one side of the armature core 11. A coil winder (not shown) is used to wind coils 14 around the salient poles P1–P6 extending radially from the center of the armature core 11 and each having a bow-shaped part 16 in the outer peripheral portion.

Figure 2A:
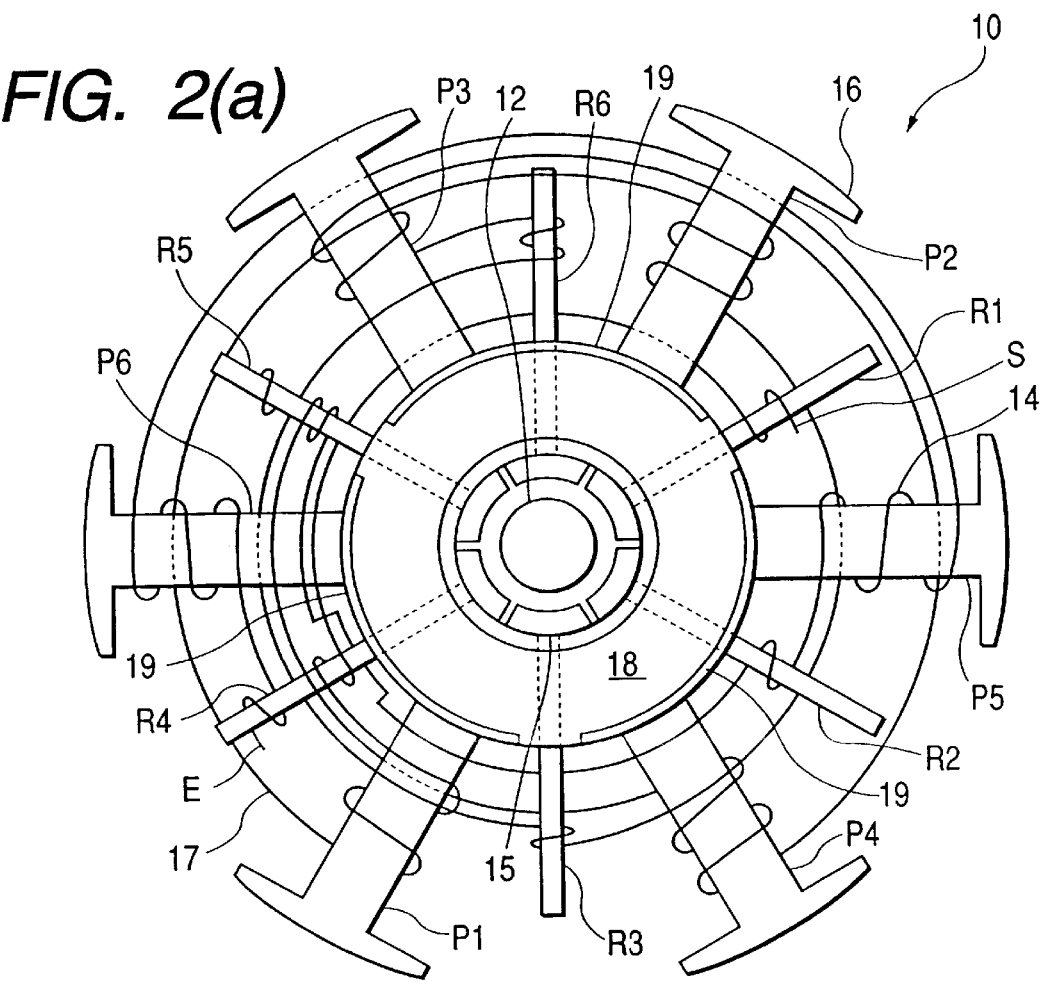
FIG. 2a is a schematic diagram and FIG. 2b is a wiring diagram to describe a winding pattern of armature coil windings of the small motor according to the invention.
Figure 2B:
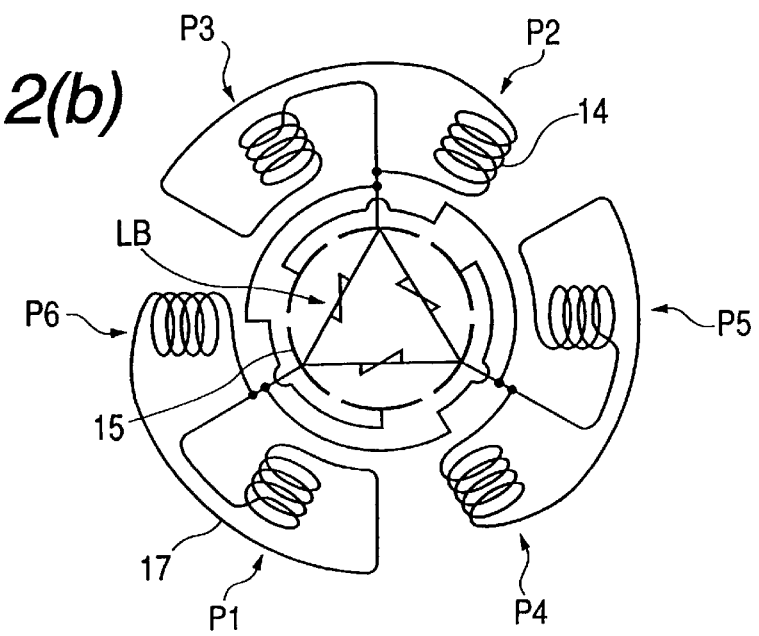

The winding means is schematically shown in FIG. 2a and a wiring diagram thereof is as shown in FIG. 2b. The illustration in FIG. 2a is furthermore expanded as a plane to a pattern drawn with a single stroke of a brush shown in FIG. 3a. For clarification, in FIG. 3a –3c, the portion of the first pair of risers and a salient pole coil winding from the winding start and the portion of a pair of risers and a salient pole coil winding at the winding end are indicated by solid lines and the portion of an intermediate pair of risers and an intermediate salient pole coil winding is indicated by the dashed line. Although the lines in FIG. 3 are cut at both ends, A, B, C, and D shown corresponding to the left and right terminals of the lines are concatenated with the corresponding parts (letters) and the winding start S to the winding end E is formed by one continuous line as will be appreciated by those skilled in the art, of course.

Figure 3A:
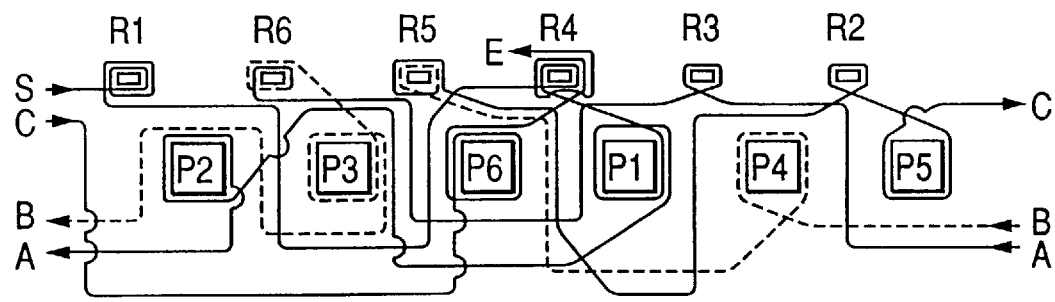
FIG. 3a is an expansion diagram of FIG. 2a to a pattern drawn with a single stroke of a brush to describe the armature coil windings of the small motor according to the invention and FIG. 3b and 3c are other expansion diagram examples of patterns drawn with a single stroke of a brush.
Figure 3B:
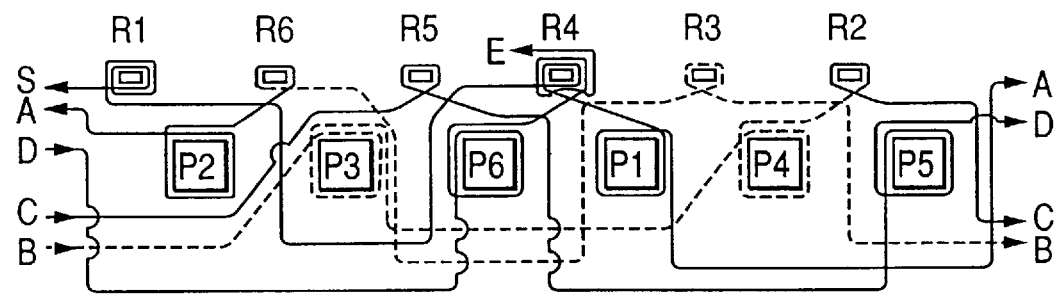
Figure 3C:
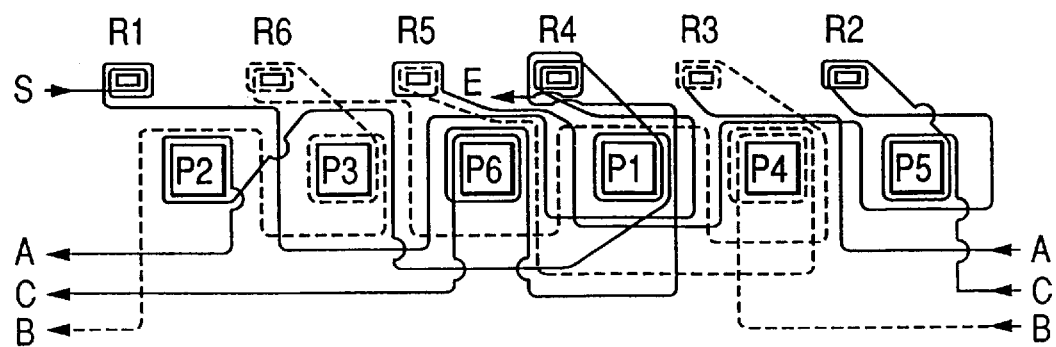

Reference numerals P1–P6 indicating the salient poles and R1–R6 indicating the risers in FIG. 3a to 3c correspond to placement of the salient poles and the risers shown in FIG. 2a. Winding of coil 14 and winding 17 in a similar manner to the pattern drawn with a single stroke of a brush will be discussed with reference to FIG. 2a and FIG. 3a.

In FIG. 2a and FIG. 3a, when winding start S of the winding 17 (solid line) is entwined around the riser R1, the wire is wound via the opposed riser R4 symmetric with the riser R1 with respect to a point of the rotation center of the armature core 11. Next, the wire is wound around the salient pole P1 adjacent to the riser R4 and the opposed salient pole P2 symmetric with the salient pole P1 with respect to a point of the rotation center of the armature core 11 in order. The coil with a first phase (for example U phase) of three phases is continuously wound on the passing way defined by R1-R4-P1-P2 without interruption. The riser R1 is not connected to the electrode part 19 of the varistor 18 and the riser R4 is connected to the electrode part 19 of the varistor 18 to suppress an over-voltage caused in the first phase. Next, the winding 17 exits the left line terminal A, enters the right line terminal A, is entwined around the riser R3, through the opposed riser R6, (dotted line) exits the left line terminal B from the adjacent salient pole P3, enters the right line terminal B, and leads to the opposed salient pole P4. The coil with a second phase (for example, V phase) of the three phases is continuously wound on the passing way defined by R3-R6-P3-P4 without interruption. The riser R3 is not connected to the electrode part 19 of the varistor 18 and the riser R6 is connected to the electrode part 19 of the varistor 18 to suppress an over-voltage caused in the second phase. Next, the winding 17 is passed to the riser R5, (solid line) is entwined around the opposed riser R2, exits the right line terminal C from the adjacent salient pole P5, enters the left line terminal C, is wound around the salient pole P6, and the winding end terminal E is entwined around the riser R4. The coil with a third phase (for example, W phase) of the three phases is continuously wound on the passing way defined by R5-R2-P5-P6 without interruption. The riser R5 is not connected to the electrode part 19 of the varistor 18 and the riser R2 is connected to the electrode part 19 of the varistor 18 to suppress an over-voltage caused in the third phase.

This is represented as a string of the reference numerals (letters) as follows: S-R1-R4-P1-P2-(left A-right A)-R3-R6-P3-(left B-right B)-P4-R5-R2-P5-(right C-left C)-P6-R4-E. FIG. 3b and 3c show other examples of patterns drawn with a single stroke of a brush. For simplicity, they are described in a similar manner that shown above.

FIG. 3b : S-R1-R4-P1-(right A-left A)-P2-R6-R3-(right B-left B)-P3-P4-R2-(left C-right C)-R5-P5-(right D-left D)-P6-R4-E.

FIG. 3c : S-R1-R4-P1-P2-(left A-right A)-R3-R6-P3-(left B-right B)-P4-R5-R2-P5-(right C-left C)-P6-R4-E.

According to any of such patterns, the coil 14 is wound around the salient poles P1–P6 containing connection to the risers R1–R6. That is, for the winding 17, a wire is wound around the salient poles P1–P6, then is entwined around the terminals of the risers R1–R6 from one salient pole to another. FIG. 3b is electrically equivalent to FIG. 3a independently of the connection order because the connection order is changed only in the two pairs of risers (R3 and R6 and R5 and R2) in FIG. 3a and the paired risers are the same potential. FIG. 3c differs from FIG. 3a only in how to route the winding 17; they are the same in the winding order around the salient poles and the risers. The patterns shown in FIG. 3a –3c are examples and any other pattern is also sufficiently possible if it is a pattern drawn with a single stroke of a brush, needless to say. Although it is best that a single wire is wound from the first phase to the third phase in the workability, if the coil is independently wound on each phase, it is appropriate to apply the ring varistor with three electrode parts to the 4-6 structure motor when the wiring pattern is improved as shown in FIGS. 3(a) to (c).

Next, as shown in FIG. 1b, a varistor 18 is fitted into the outer diameter of a commutator holding ring 21 from the opposite side (top face in the figure) to the armature core 11 with respect to the commutator holder 20. The outer diameter of the commutator holding ring 21 is formed so as to show a loose fit to an annular inner face 22 of the varistor 18 for suppressing damage to the varistor caused by a forcible fit. The varistor 18 has three electrode parts 19 fixed to the three risers R2, R4, and R6 together with the winding 17 by soldering 24. Only the winding 17 is connected to other risers R1, R3, and R5 by soldering 25.

A small-diameter varistor 18 indicated by the phantom line in FIG. 1b can also be attached to the position of a flange part 23 of the commutator holder 20 from the armature core 11 side (lower face in the figure). At this time, the flange part 23 of the commutator holder 20 is shrunk in diameter so as to fit to the annular inner face 22 of the varistor 18.

Figure 4A:
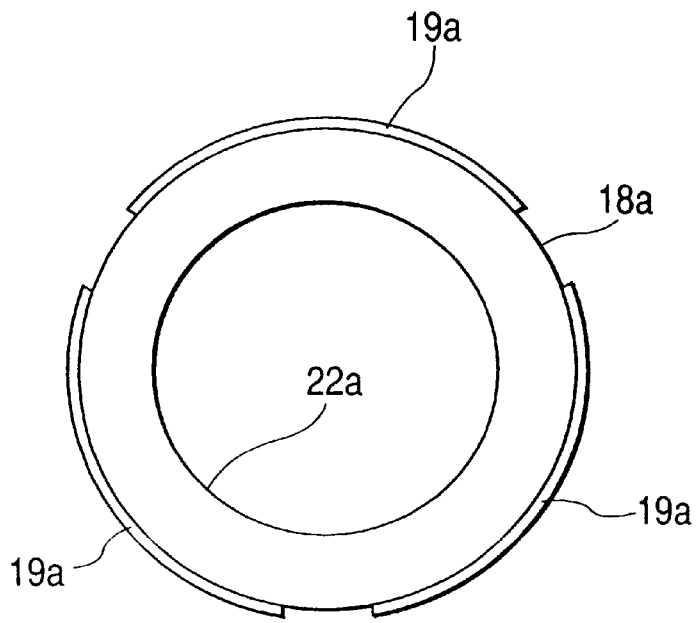
FIG. 4 shows embodiments of varistors used with the small motor according to the invention; 4a is a plan view of a varistor formed with electrode parts on an outer peripheral side face and 4b is a plan view of a varistor formed with electrode parts on one face.
Figure 4B:
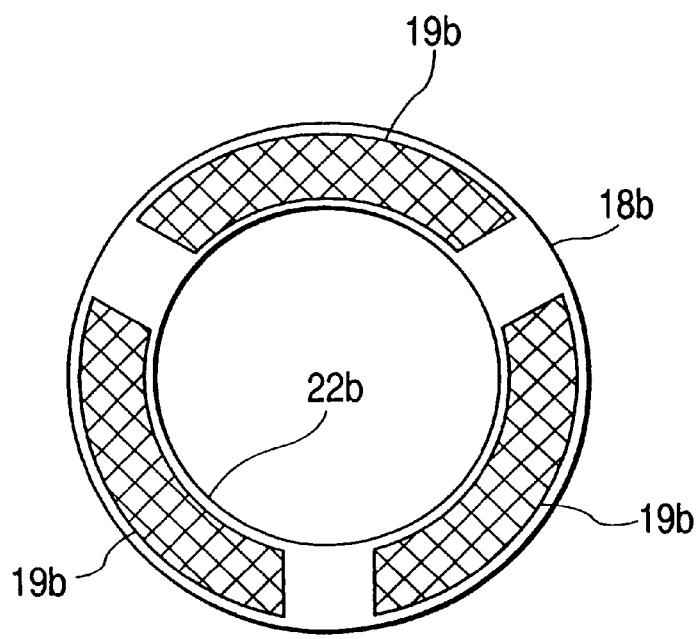
Figure 5:
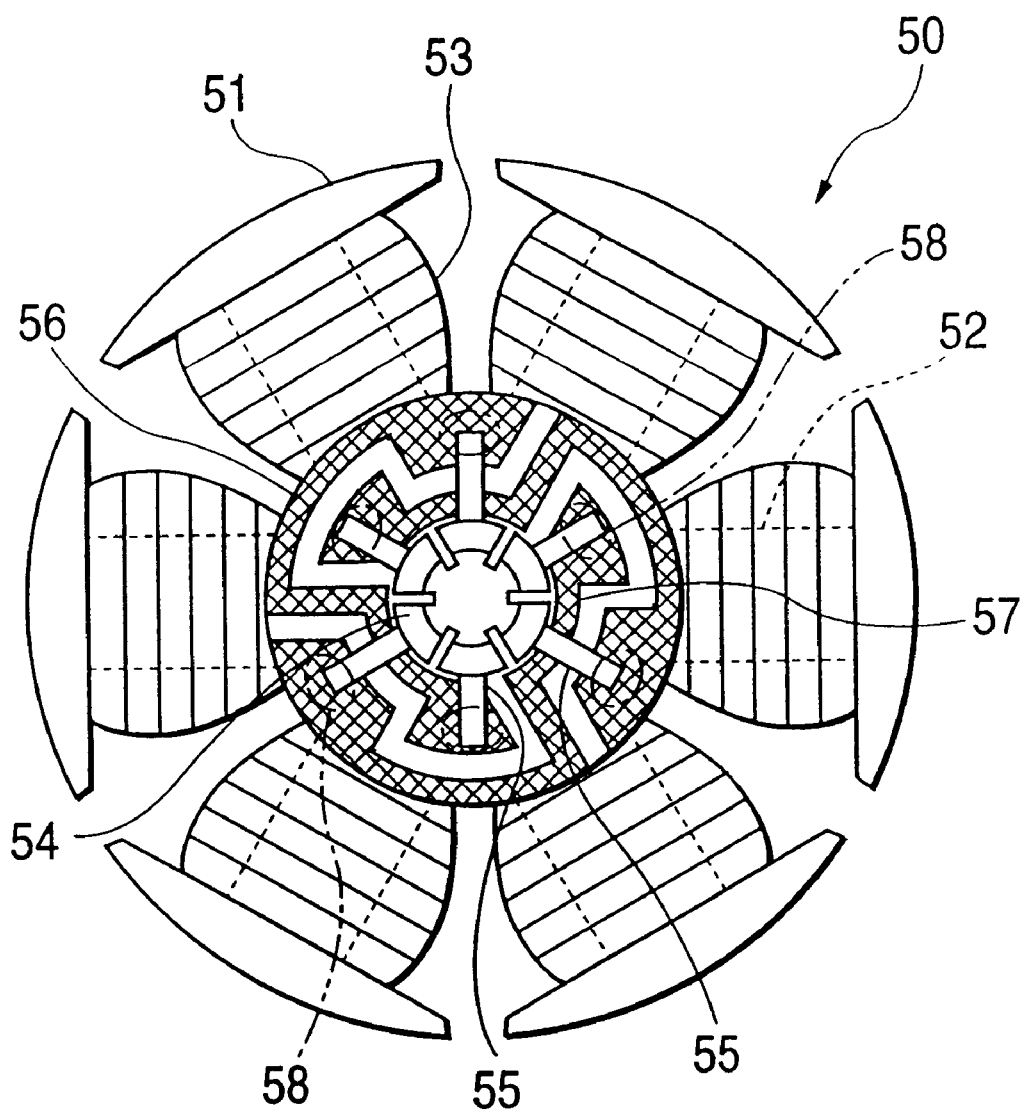
FIG. 5 is a plan view of an armature of a small motor in a related art.

FIGS. 4a and 4b show embodiments of the varistor 18. FIG. 4a shows a varistor 18a having three equal-sized electrode parts 19a insulated from each other on the outer peripheral side surface and an inner face 22a for a fit. FIG. 4b shows a varistor 18b having three equal-sized flat electrode parts 19b insulated from each other along the circumference on one face and an inner face 22b for a fit. The numeral 18 used above in the description denotes the varistor 18a shown in FIG. 4a.

That is, the varistor 18a, the electrodes 19a, and the inner face 22a in FIG. 4a correspond to the varistor 18, the electrodes 19, and the inner face 22 respectively. The varistor 18b shown in FIG. 4b can also function as the varistor 18 by soldering the electrode parts 19b to the risers R2, R4, and R6.

As described above, according to the small motor according to the invention, a general ring varistor used with an armature of a 2-3 (2-magnetic-pole—3-salient-pole) structure can be applied to a device for extinguishing spark arcs for suppressing overvoltage of an armature of a 4-6 (4-magnetic-pole—6-salient-pole) structure without special working and moreover a special wiring pattern is not used, thus part-to-part accuracy is not required and the structure and parts management can be simplified sufficiently.

Because of coil winding according to a pattern drawn with a single stroke of a brush, automation is facilitated and productivity can be improved. Further, the varistor can be miniaturized, so that the armature itself can be well fitted to miniaturization.

What is claimed is:

1. A three-phase motor comprising:

an armature having six salient poles radially arranged and a three-phase coil wound around said salient poles;

six risers connected to said three-phase coil;

six commutators being joined to said risers in a one-to-one correspondence;

a ring varistor being connected to some of said risers for suppressing overvoltage;

a brush coming in sliding contact with said commutators for supplying a current; and a permanent magnet having four magnetic poles, placed facing said salient poles;

wherein said ring varistor is provided with three electrode parts to which alternate three of said six risers are connected, wherein a same phase portion of said three-phase coil has windings wound on a pair of said risers, one riser of said pair of risers being connected to one of said three electrode parts, wherein said risers of said pair of risers are arranged symmetrically with respect to a rotation axis of said armature, and wherein at least one wire of said three-phase coil wound around said salient poles is the same wire wound on said pair of risers and connecting together said pair of risers.

2. The three-phase motor as claimed in claim 1, wherein said six risers constitute three of said pair of risers, and said risers in each pair are continuously connected together.

3. The three-phase motor as claimed in claim 1, wherein said six risers are connected together with said salient poles by a single wire of said three-phase coil.

4. The three-phase motor as claimed in claim 1, wherein said six risers (1) respectively extend from said six commutators in a radial direction, and (2) are arranged to shift said three-phase coil extending from said salient poles in an axis direction, such that said three-phase coil is connected to said risers and connects said risers together.

5. The three-phase motor as claimed in claim 4, wherein each of said risers has a protruded portion that extends beyond an outer peripheral portion of said ring varistor and said three-phase coil is connected to said protruded portion.

6. The three-phase motor as claimed in claim 4, wherein each of said risers is circumferentially positioned between consecutive salient poles.

7. The three-phase motor as claimed in claim 1, wherein all of the wires of said three-phase coil wound around said salient poles are also wound on said pair of risers and connect together said pair of risers.

* * * * *